United States Patent
Volmer et al.

(10) Patent No.: US 10,532,233 B2
(45) Date of Patent: Jan. 14, 2020

(54) HEAD SIMULATOR FOR TESTING RESPIRATORS

(71) Applicant: Dräger Safety AG & Co. KGaA, Lübeck (DE)

(72) Inventors: Achim Volmer, Krummesse (DE); Michael Brodersen, Wahlstedt (DE)

(73) Assignee: Dräger Safety AG & Co. KGaA, Lübeck (DE)

( * ) Notice: Subject to any disclaimer, the term of this patent is extended or adjusted under 35 U.S.C. 154(b) by 231 days.

(21) Appl. No.: 15/834,595

(22) Filed: Dec. 7, 2017

(65) Prior Publication Data

US 2018/0161605 A1 Jun. 14, 2018

(30) Foreign Application Priority Data

Dec. 9, 2016 (DE) .................. 10 2016 014 637

(51) Int. Cl.
*G09B 23/28* (2006.01)
*A62B 27/00* (2006.01)
*G09B 23/30* (2006.01)

(52) U.S. Cl.
CPC ............ *A62B 27/00* (2013.01); *G09B 23/288* (2013.01); *G09B 23/30* (2013.01)

(58) Field of Classification Search
USPC .................................. 434/262, 265, 267, 270
See application file for complete search history.

(56) References Cited

U.S. PATENT DOCUMENTS

| 3,874,093 A | * | 4/1975 | Garbe | ................. G09B 23/285 |
| | | | | 434/265 |
| 4,796,467 A | * | 1/1989 | Burt | ..................... A62B 27/00 |
| | | | | 128/200.24 |
| 5,055,052 A | * | 10/1991 | Johnsen | ............... G09B 23/288 |
| | | | | 434/265 |
| 5,823,787 A | * | 10/1998 | Gonzalez | ............... G09B 23/28 |
| | | | | 434/265 |
| 5,853,292 A | * | 12/1998 | Eggert | .................. G09B 23/28 |
| | | | | 434/262 |

(Continued)

FOREIGN PATENT DOCUMENTS

| DE | 34 27 182 A1 | 1/1986 |
| DE | 91 07 222 U1 | 9/1991 |
| DE | 41 29 848 A1 | 3/1993 |

OTHER PUBLICATIONS

Brüel & Kjær: "Head and Torso Simulator Types 4128-C and 4128-D Handset Positioner for HATS Type 4606".

*Primary Examiner* — Kurt Fernstrom
(74) *Attorney, Agent, or Firm* — McGlew and Tuttle, P.C.

(57) ABSTRACT

A head simulator, for testing respirators, has a head simulator body (2) with a simulated oral aperture (6) and with a simulated oral cavity (4), which is located behind the simulated oral aperture (6) in the head simulator body. A loudspeaker (8) is arranged in the simulated oral cavity (4). An audio unit (20) is connected to the loudspeaker (8) for reproducing speech via the loudspeaker (8). The head simulator includes a simulated trachea (10), which is in connection with the simulated oral cavity (4) and opens into the simulated oral aperture (6). An air delivery device (30) is provided, which can be operated to allow air to flow through the simulated trachea (10) and the simulated oral aperture (6).

14 Claims, 4 Drawing Sheets

(56) References Cited

U.S. PATENT DOCUMENTS

| | | | |
|---|---|---|---|
| 6,296,490 B1* | 10/2001 | Bowden ............... | G09B 23/288 |
| | | | 434/265 |
| 6,780,016 B1* | 8/2004 | Toly .................... | G09B 23/285 |
| | | | 434/262 |
| 9,460,639 B2* | 10/2016 | Mansi .................. | G09B 23/288 |
| 2006/0009970 A1 | 1/2006 | Harton et al. | |
| 2007/0259322 A1* | 11/2007 | Yuasa ................... | A62B 27/00 |
| | | | 434/262 |
| 2011/0301751 A1 | 12/2011 | Gao et al. | |
| 2013/0216992 A1* | 8/2013 | Simeoni .............. | G09B 23/285 |
| | | | 434/265 |
| 2015/0283342 A1* | 10/2015 | Mielcarz ............. | G09B 23/288 |
| | | | 128/202.22 |

\* cited by examiner

HEAD SIMULATOR FOR TESTING RESPIRATORS

CROSS REFERENCE TO RELATED APPLICATIONS

This application claims the benefit of priority under 35 U.S.C. § 119 of German Application 10 2016 014 637.0, filed Dec. 9, 2016, the entire contents of which are incorporated herein by reference.

FIELD OF THE INVENTION

The present invention pertains to a head simulator for testing respirators, which has a head simulator body with a simulated oral aperture and with a simulated oral cavity, which oral cavity is located behind the simulated oral aperture in the head simulator body and in which a loudspeaker is arranged, and an audio unit is connected to the loudspeaker for producing sound in the form of reproduced speech via the loudspeaker.

BACKGROUND OF THE INVENTION

Such a head simulator is used to evaluate communication systems. In addition to the designation "Kunstkopf" head simulator, the term, head and torso simulator or the acronym HATS for short, is used as well. The present application pertains to head simulators for respirators, which are equipped with communication systems.

A respirator has a breathing mask, and there are various types of respirators that differ from one another in the manner in which breathing air is supplied: Breathing of ambient air through a filter, supply of ambient air through a blower and a filter, and, in case of a compressed air breathing apparatus, supply of air from a compressed air cylinder through a demand oxygen system. The combination of breathing mask and air source leads to respirators that are designated in the American English usage as follows:—Air Purifying Respirator (APR): Breathing mask+filter;—Powered Air Purifying Respirator (PAPR): Breathing mask+blower filter; and—Self-Contained Breathing Apparatus (SCBA): Breathing mask+compressed air breathing apparatus.

These respirators differ for the user primarily by the protection factor provided. It is, however, common to all respirators that they more or less greatly impair the audibility and the intelligibility of the respirator user's speech.

Verbal communication is one of the most important types of communication. This may differ in terms of loudness, sound quality, delay, speech intelligibility and many other factors. Unobstructed communication is not always possible, which applies especially to users of respirators. Electronic communication systems are therefore used for support. Such a communication system comprises a microphone in the interior of the mask, which picks up the words spoken by the user of the respirator and reproduces them via a loudspeaker on the outer surface of the breathing mask. In addition or as an alternative, the picked-up microphone signals may also be transmitted in a wireless manner to a receiver and reproduced there via a loudspeaker or earphone. The use of speaker simulators, also called head simulator, is an already established procedure for evaluating and optimizing the efficiency of such communication systems. A communication system can thus be evaluated reproducibly and objectively. The test set-up in this case imitates the routine use very well and thus makes a meaningful evaluation possible. The head simulators therefore have a head simulator body with as natural a head shape as possible and in it a simulated oral cavity with simulated oral aperture, behind which a loudspeaker is installed as a sound source in the simulated oral cavity. The sound of the loudspeaker is emitted from the simulated oral aperture in a bundled form, and acoustic tests can thus be carried out on communication systems under reproducible conditions. Such a head simulator is, for example, the device 4128-C of the company Brüel & Kjaer, which has the features including a head simulator body with a simulated oral aperture, a simulated oral cavity, a loudspeaker and an audio unit connected to the loudspeaker for reproducing speech via the loudspeaker.

Oral communication plays a prominent role above all for fire departments, because direct and natural communication must function especially effectively here during rescue operations involving danger to life. Communication systems are needed especially urgently during rescue operations involving the use of respirators because the natural speech is markedly impaired due to the use of a breathing mask, which attenuates especially high-frequency components of speech. As was mentioned, prior-art communication systems for breathing masks have an integrated speech amplifier, which compensates the attenuation caused by the mask by the speech picked up by a microphone being reproduced in an amplified form by means of loudspeakers located on the outer side of the breathing mask. The speech intelligibility is improved in this manner.

A headset function for radio communication is often additionally integrated in a mask-based communication system. An analog or digital radio is connected for this to the mask-based communication system with a cable or a wireless interface (e.g., Bluetooth). Marked improvement is thus achieved compared with working with a hand-held radio due to the integration of the microphone for sending the voice signals in the mask. The received signal is played via an earphone in such systems.

The breath sounds occurring during the operation are likewise picked up by the microphone and reproduced by the loudspeakers in an amplified form. However, these breath sounds interfere with the communication and the microphone signals are therefore filtered by means of digital signal processing in a signal processor in the communication unit in order to suppress breath sounds and thus possibly not to reproduce them via the loudspeakers and not to transmit them by radio.

The optimization of precisely this functionality of breath sound suppression represents a challenge in connection with the development. A clear automatic separation between breath sounds and speech is essential here in order to make optimal, trouble-free communication possible.

The case of use to be optimized cannot satisfactorily be simulated by means of the above-described head simulators, which can only simulate the speech, because the head simulators can only reproduce the breath sounds by means of the loudspeaker, and these sounds differ greatly from real breath sounds. The evaluation of respirators with communication units is thus only possible relative to the speech, but it cannot be accomplished in such a way that the effects of the breathing of the respirator user are taken into consideration in a realistic manner.

SUMMARY OF THE INVENTION

An object of the present invention is to configure a head simulator such that respirators with communication systems can be tested and evaluated with the head simulator with respect to quality of the communication functions in a realistic and reproducible manner.

According to the invention, a head simulator is provided for testing respirators. The head simulator comprises a head simulator body with a simulated oral aperture, a simulated oral cavity located behind the simulated oral aperture in the head simulator body, a loudspeaker operatively connected to the simulated oral cavity and an audio unit connected to the loudspeaker for reproducing speech via the loudspeaker. Provisions are made according to the present invention for a simulated trachea, which leads into the head simulator body, that is in connection with the simulated oral cavity and opens into the simulated oral aperture. An air delivery device can be operated to allow air to flow through the simulated trachea and the simulated oral aperture. The interaction of an air flow through the simulated trachea and the simulated oral cavity and farther through the simulated oral aperture with the speech generated by the loudspeaker in the simulated oral cavity can realistically be simulated in this manner. When testing a respirator, the air flow generated also flows through the breathing mask and therefore it also realistically simulates the noises generated thereby. As a result, filter programs in the communication systems of the respirators, which are used to suppress the breath sounds, can also be tested and checked for their effectiveness. The head simulator body is preferably a hollow body, which may be divided by one or more partitions, and extends through the simulated trachea to the simulated oral aperture on its surface. The simulated oral cavity is arranged in the hollow body of the head simulator body as an additional hollow body, which opens into the simulated trachea. A hollow body, which forms a resonance space with a volume of 500 $cm^3$ to 1,500 $cm^3$ for the loudspeaker, may be formed around the simulated oral cavity in the hollow body of the head simulator body.

A control unit, which is configured to control the operation of the air delivery device in terms of the flow direction and the volume flow of the flow generated through the simulated trachea and oral aperture, is present in a preferred embodiment. The control device may be configured to actuate the air delivery device to generate a flow with a predefined flow direction and predefined, constant volume flow over time. Such a constant volume flow through the simulated trachea and the oral aperture already provides for a simulation of the breath sounds that can be used in practice. Such a constant air flow may be generated by an air delivery device in the form of a blower.

As an alternative, the control device and the air delivery device may be configured to generate a flow with variable volume flow profile, which flow simulates the phases of inhalation (inspiration) and exhalation (expiration) and is alternating in terms of flow direction, under the control of the control unit. An air flow through the simulated trachea and the simulated oral aperture, which oscillates in terms of the flow direction and disappears at the end of a phase of expiration, makes it possible realistically to simulate the effect of breath sounds with all phases of the breath cycles.

This realistic simulation of breath sounds makes it possible to test accessories, for example, microphones, in the breathing mask under realistic conditions of the use of the respirator and breathing mask. For example, filter circuits, which condition the voice signals detected with the microphone for further processing for a retransmission, for example, by means of a radio transmission, may be adapted to the situation of the breathing mask and the respirator.

The control unit is preferably configured to operate the air delivery device with a volume flow profile that is variable over time and has shorter phases of inspiration with higher mean volume flow and, by contrast, longer phases of expiration with lower mean volume flow.

Shorter phases of inspiration with medium volume flow and longer phases of expiration with lower volume flow correspond to realistic breathing of the user of a respirator. A realistic simulation of inspiration and expiration has the advantage that the filter circuits, which process the voice signals for the radio transmission, can be adapted to intensities of the influence of the volume flow, which change over time, and high-quality testing of the filter circuits is thus made possible by means of this configuration.

In a preferred embodiment, the control unit is configured to synchronize the operation of the audio unit and of the air delivery device such that speech is reproduced (sound is produced in the form of reproduced speech) via the loudspeaker exclusively during phases of expiration. This corresponds to the conditions prevailing during speech, which is produced during phases of expiration.

The synchronization of phases of expiration with the reproduction of speech makes it possible to carry out the signal processing in a different manner during phases of inspiration. This head simulator is thus able to provide a possibility for testing signal processings or filter circuits, which are different for phases of inspiration and phases of expiration.

The air delivery device may have a blower. The blower may have a delivery capacity that is controlled by the control unit, in conjunction with the simulated trachea. It is also possible, in principle, to generate an air flow with oscillating flow direction by a blower by alternatingly changing the pumping direction of the blower.

As an alternative, the air delivery device may have a bellows connected to the simulated trachea and connected to an actuator. The actuator is configured to act, controlled by the control unit, on the bellows, in order to vary the inner volume of the bellows as a function of the time such that the flow flowing through the simulated trachea and the simulated oral aperture is generated with a predefined flow profile alternating in relation to the flow direction. The bellows acts in this case here, in principle, as a simulated lung. The bellows is periodically compressed and expanded again by the actuator in order to generate air flows to simulate the phases of expiration and inspiration of breathing.

Due to the action of the bellows being nearly identical to the rising and lowering of the thorax of a respirator user, it becomes possible with the air delivery device very realistically to simulate the application. This is advantageous because conditions, that are comparable to the conditions of the thorax, trachea and oral cavity, become established as a result in the oral cavity. The oral cavity acts as a resonance space, because the bellows is configured as a partial element of the resonance space.

In a preferred embodiment, the simulated trachea has a first straight section leading through the cervical area of the head simulator body and a second straight section, which is connected thereto by a bent transition area and is at right angles thereto, whose end that is at a distance from the first section forms the simulated oral aperture. As a result, an air flow with a deflection like in the natural pharyngeal cavity is generated.

In a preferred embodiment, the simulated oral cavity is funnel-shaped, and the loudspeaker is arranged in the simulated oral cavity at the end with the larger diameter (larger dimension) and essentially covers this. Furthermore, the simulated oral cavity is in connection with the simulated trachea by the funnel-shaped oral cavity opening with a funnel-shaped oral cavity end with the smaller diameter in front of the simulated oral aperture into the section of the simulated trachea. The funnel-shaped configuration of the simulated oral cavity is advantageous because a loudspeaker membrane with a correspondingly larger diameter (larger dimension), whose larger diameter is needed to generate a realistic sound pressure level, can be inserted as a result at the end with the larger diameter. The sound pressure level should be at least 97 dB at the mouth reference point (about 5 cm in front of the simulated oral aperture). The diameter of the loudspeaker membrane may be in the range of 50 mm to 100 mm. The loudspeaker shall generate frequencies in the range of 20 Hz to 20 kHz.

The frequencies generated by the loudspeaker in the range of 20 Hz to 20 kHz correspond to the frequency range that is usually used by the human speech of both male and female respirator users.

Opening into a simulated trachea that has a smaller diameter (smaller dimension) compared to the larger diameter (larger dimension) of the funnel-shaped, simulated oral cavity is possibly due to the funnel-shaped configuration of the simulated oral cavity. The funnel-shaped configuration of the simulated oral cavity ensures a reduction of the cross section in front of the opening into the simulated trachea, without steps or jumps occurring in the simulated oral cavity or trachea, which avoids sound reflections.

In a preferred embodiment, the first section and the second section of the simulated trachea are tubular with a diameter in the range of 15 mm to 45 mm.

In a preferred embodiment, the first section of the simulated trachea has a length in the range of 120 mm to 180 mm and the second section has a length in the range of 130 mm to 200 mm.

In a preferred embodiment, the funnel-shaped, simulated oral cavity opens obliquely from the top or coaxially into the second section of the simulated trachea on the side located opposite the first section in front of the simulated oral aperture, the longitudinal axis of the funnel-shaped oral cavity being directed at an angle in the range of 0° to 90° to the longitudinal axis of the second section of the simulated trachea. An angle of 0° means that the longitudinal axis of the funnel-shaped, simulated oral cavity is parallel to the longitudinal axis of the second section of the simulated trachea and the funnel-shaped, simulated oral cavity opens with its end having the smaller diameter in the end area of the second section of the simulated trachea, which end area is located opposite the simulated oral aperture. An angle of 90° means that the funnel-shaped, simulated oral cavity opens into the second section of the simulated trachea from the top.

An orientation of the simulated funnel-shaped oral cavity in the range of 30° to 60° to the longitudinal axis of the section of the simulated trachea is preferred, so that the simulated oral cavity opens obliquely from the top into the second section of the trachea, in which case the sound generated has a component directed towards the simulated oral aperture. The funnel-shaped, simulated oral cavity opens here into the second section of the simulated trachea directly in front of the simulated oral aperture.

The described dimensions (diameter, length) of the first and second sections of the simulated trachea now offer, in conjunction with the arrangement and orientation of the simulated, funnel-shaped oral cavity in relation to the longitudinal axis, the advantage that an average geometry of the oral tube (oral cavity) with resonance space is provided, which is very close to the anatomic conditions of a real head with oral cavity, pharyngeal space and trachea in connection with the lungs of a device user. This leads to a very realistic simulation of speech communication with a breathing mask by means of this head simulator in interaction with the suitable frequency range of the speech transmission and in interaction with the air delivery device.

The present invention will be described below on the basis of an exemplary embodiment shown in the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
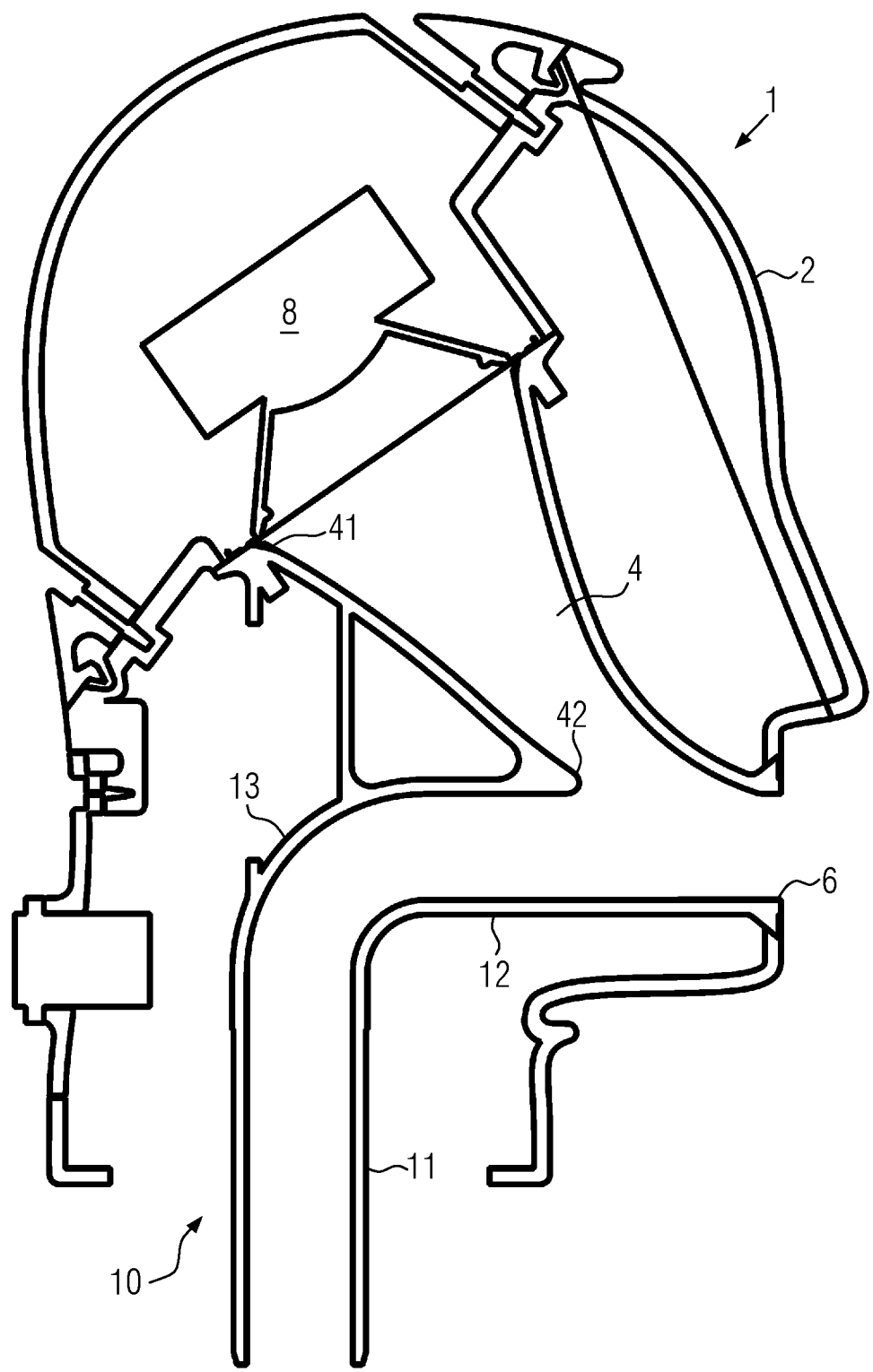
FIG. 1 is a cross sectional view through a head simulator body in a configuration of a head simulator according to the present invention.

Referring to the drawings, the head simulator body 2, which is shown in cross section in FIG. 1, is manufactured predominantly as a hollow body and preferably from a plastic. A simulated oral cavity 4, which is in connection with a simulated oral aperture 6, is provided in the head simulator body 2. The simulated oral cavity 4 has a funnel-shaped configuration, the end 42 with the smaller diameter facing the simulated oral aperture and the end 41 with the larger diameter being located farther away from the simulated oral aperture 6. A loudspeaker 8, which covers the end 41 with the larger diameter, is connected at the end 41 with the larger diameter. Furthermore, a simulated trachea 10, which is in connection with the simulated oral cavity 4 and which opens into the simulated oral aperture 6, is provided in the hollow head simulator body 2. The simulated trachea 10 has a first, straight section 10 passing through a cervical area of the head simulator body 2 and a second straight section 12, which is connected to it by a bent transition area 13 and is oriented at right angles, and whose end located away from the first sedition forms the simulated oral aperture 6.

The head simulator body 2 may have a multipart configuration, consisting of, e.g., two parts, which can be taken apart. The part corresponding to the posterior area of the skullcap of the head simulator body is a separate part in this example, which is connected to the rest of the head simulator body 2 via detachable fastening devices. The loudspeaker 8 becomes accessible by loosening and removing the part corresponding to the posterior area of the skullcap. A cavity, which forms a resonance space for the loudspeaker 8, is present behind the loudspeaker 8 within the part of the head simulator body corresponding to the posterior area of the skullcap.

As was mentioned, the simulated oral cavity 4 has the shape of a funnel with an inner end 41 with a larger diameter, which is covered by the loudspeaker 8, and with an end 42 with a smaller diameter, which is located close to the simulated oral aperture 6 and which opens obliquely from the top into the second section 12 of the trachea in the anterior area of the simulated trachea, which area adjoins the simulated oral aperture 6. The funnel shape of the simulated oral cavity 4 has, on the one hand, the advantage that a certain focusing of the sound into the area of the simulated trachea adjoining the simulated oral aperture 6 is achieved. Furthermore, the funnel shape makes it possible to arrange a loudspeaker 8 with a correspondingly larger diameter at the end 41 with the larger diameter. A loudspeaker with a sufficiently large diameter, which is preferably in the range of 50 mm to 100 mm, is preferred to generate a realistic sound pressure level. The funnel shape of the simulated oral cavity 4 and the configuration of the loudspeaker 8 are preferably selected to be such that a sound pressure level of at least 97 dB is generated at the mouth reference point, at about 5 cm in front of the simulated oral aperture 6.

The funnel-shaped configuration of the simulated oral cavity 4 makes it further possible for it to open with its end 42 with the smaller diameter into the simulated trachea 10, which has a diameter comparable to that of the end 42 with the smaller diameter. In other words, the funnel-shaped configuration of the simulated oral cavity 4 ensures the adaptation of the large diameter of the loudspeaker 8 to the smaller diameter at the end 42, which approximately corresponds to the diameter of the second section 12 of the simulated trachea. The adaptation of the diameter (dimensions) of the end 42 with the smaller diameter (smaller dimensions) of the simulated oral cavity 4 and of the diameter (dimensions) of the second section 12 of the simulated oral cavity 4, namely an adaption with a smooth transition, is preferred in order for no steps or jumps, which could generate undesired sound reflections, to be present in the simulated oral cavity 4 or of the simulated trachea 10 in the area of the transition.

Figure 3:
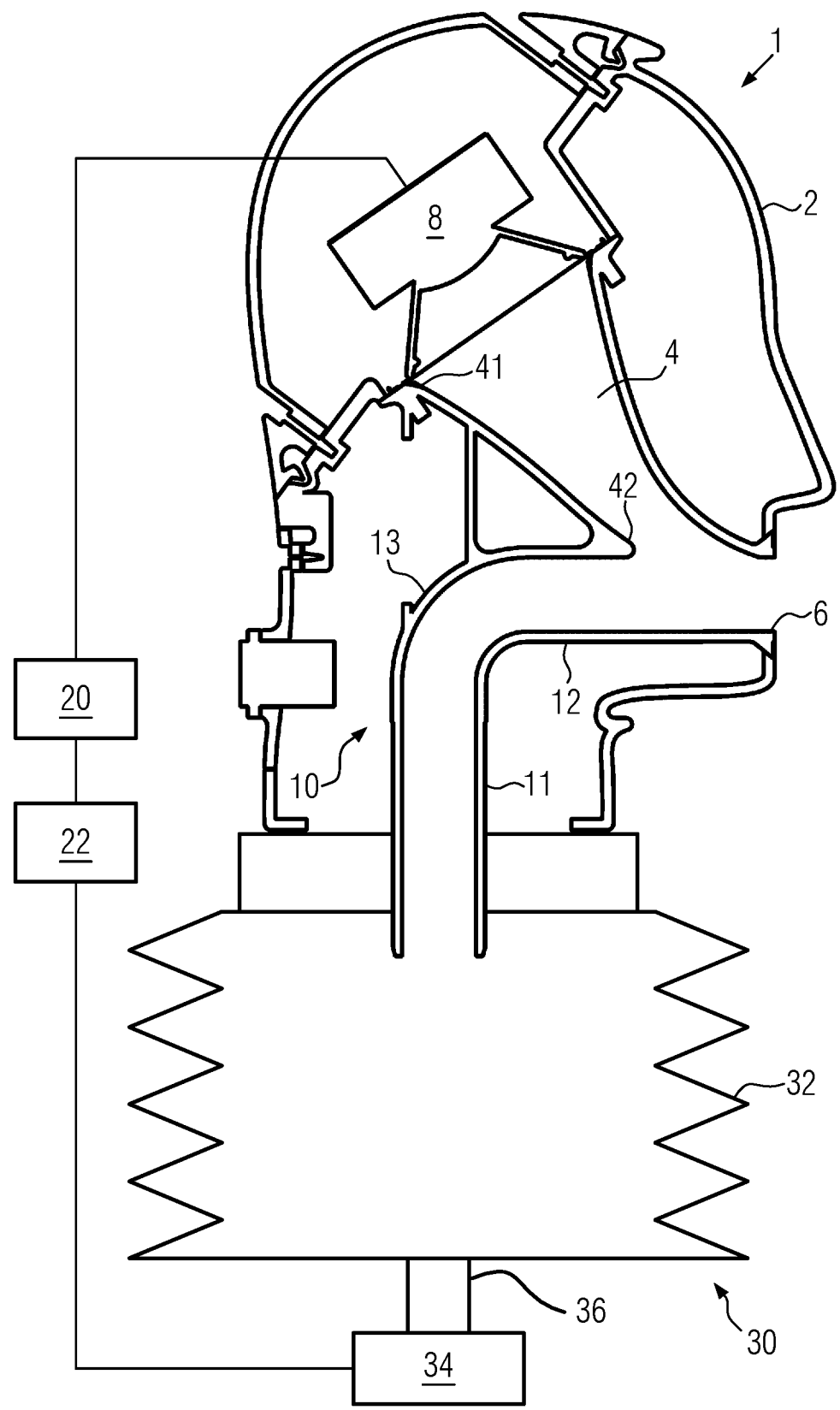
FIG. 3 is a schematic cross-sectional view of the head simulator body from FIG. 1 with additional components of the head simulator according to an embodiment of the present invention.
Figure 4:
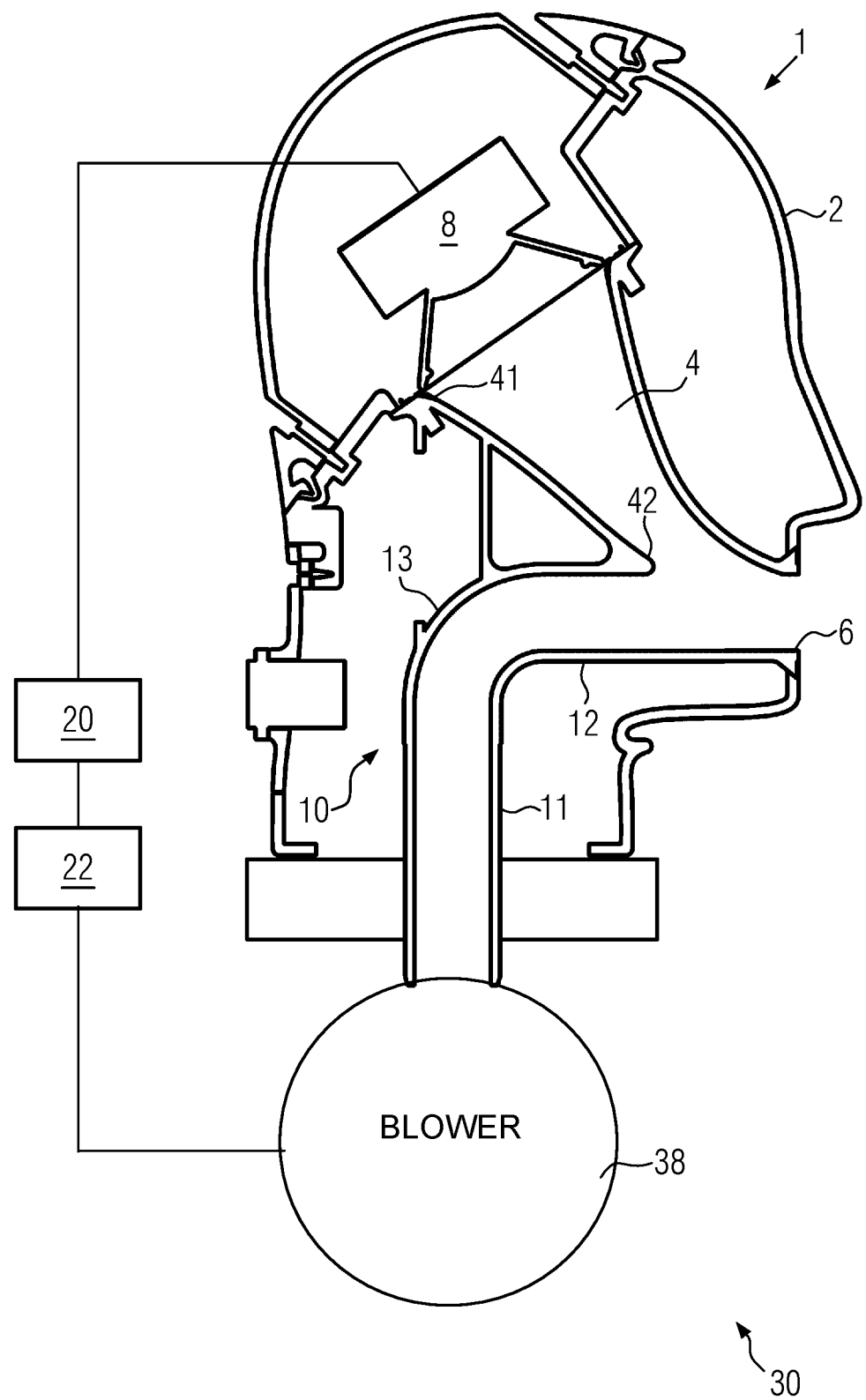
FIG. 4 is a schematic cross-sectional view of the head simulator body from FIG. 1 with additional components of the head simulator according to another embodiment of the present invention.

Additional components of the exemplary embodiment of the head simulator according to the present invention will now be described with reference to FIG. 3. The head simulator 1 further has an air delivery device 30, which can be operated to allow air to flow through the simulated trachea 10 and the simulated oral aperture 6. In this exemplary embodiment, the air delivery device 30 comprises a bellows 32 and an actuator 34 in the form of a motor. The actuator 34 acts via a transmission 36, on the bellows 32 in order to compress the bellows 32 and to allow it to expand again. As a result, air is ejected through the simulated trachea 10 and drawn in again in order thus to simulate a phase of expiration and a phase of inspiration. The operation of the air delivery device 30 is controlled by a control unit 22, which controls the actuator 34. As a result, the stroke volume and the duration of the phase of expiration and of the phase of inspiration as well as the volume flow profiles thereof can be selectably predefined by the control unit 22 as a function of time. As an alternative the air delivery device 30 comprises a blower 38. The operation of the air delivery device 30 with the blower 38 is again controlled by a control unit 22.

The control unit 22 may be provided with different profiles for phases of inspiration and phases of expiration. The breathing profiles preferably have shorter phases of inspiration with a larger mean volume flow and, by contrast, longer phases of expiration with lower mean volume flow. It is also possible to store different breathing profiles in the control unit 22 in order thus to be able to simulate different states of breathing in different physical stress situations. The control unit may be configured for this to offer a human operator the possibility of inputting parameters with an input unit, e.g., durations of phases of expiration and phases of inspiration, tidal volumes, volume flows as a function of time and the like.

Furthermore, an audio unit 20 is present, in which examples of speech sequences are stored. The audio unit 20 is connected to the loudspeaker 8 in order to reproduce speech sequences via the loudspeaker 8. The audio unit 20 may also be integrated in the control unit 22.

The control unit 22 is connected to the audio unit 20 and is configured to coordinate the operation of the air delivery device 30 with that of the loudspeaker 8. The operation of the audio unit is preferably synchronized by the control unit for reproducing speech sequences via the loudspeaker 8 with the operation of the air delivery device such that reproduction of speech via the loudspeaker 8 takes place exclusively during phases of expiration.

Preferred configurations and dimensions of the head simulator body 2 will be explained with reference to FIG. 2, which shows the same cross-sectional view as FIG. 1 and containing marks instead of the reference numbers to explain dimensions.

Figure 2:
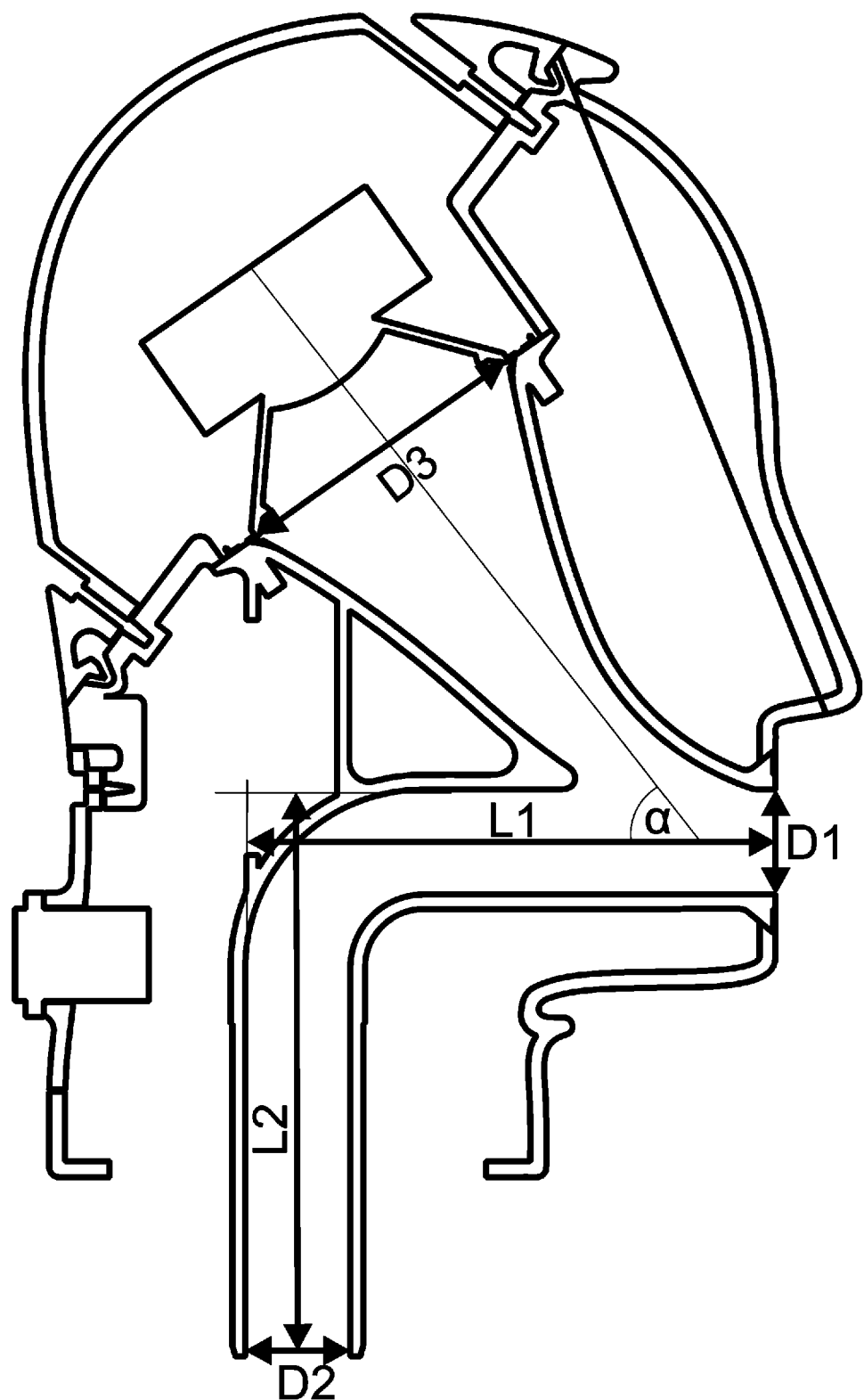
FIG. 2 is a cross sectional view as in FIG. 1, in which the reference numbers from FIG. 1 are omitted and dimensions are shown with their designations.

In the preferred embodiment shown in FIG. 2, the funnel-shaped, simulated oral cavity 4 opens obliquely from the top into the second section of the simulated trachea on the side located opposite the first section, and the junction point is located close to the simulated oral aperture 6. The longitudinal axis of the funnel-shaped, simulated oral cavity forms an angle α with the longitudinal axis of the second section of the simulated trachea, the angle α equaling about 45° in the embodiment shown. Orientation of the longitudinal axis of the simulated oral cavity at an angle α in the range of 30° to 60° in relation to the longitudinal axis of the second section of the simulated trachea is preferred. However, the orientation may, in principle, be selected with an angle α in the range of 0° to 90°, wherein an angle of 0° means that the simulated oral cavity opens with its end with the shorter diameter coaxially into the rear end area of the second section of the simulated trachea in relation to the simulated oral cavity. An orientation of α<90° is preferred to obtain an emission characteristic directed towards the simulated oral aperture.

The dimensions of the simulated trachea are preferably as follows: The first section of the simulated trachea, located in the cervical area, is tubular and has a length L2 in the range of 120 mm to 180 mm and a diameter D2 in the range of 15 mm to 45 mm. The second section of the simulated trachea directed at right angles to the first section is preferably likewise tubular and has a diameter D1 that is equal to the diameter D2 of the first section and is preferably likewise in the range of 15 mm to 45 mm. The length L1 of the second section of the simulated trachea is preferably in the range of 130 mm to 200 mm.

The diameter of the simulated oral cavity at its end with the larger diameter D3 is preferably in the range of 50 mm to 100 mm.

While specific embodiments of the invention have been shown and described in detail to illustrate the application of the principles of the invention, it will be understood that the invention may be embodied otherwise without departing from such principles.

What is claimed is:

1. A head simulator for testing respirators, the head simulator comprising:
a head simulator body with a simulated oral aperture;
a simulated oral cavity located behind the simulated oral aperture in the head simulator body;
a loudspeaker operatively connected to the simulated oral cavity;
an audio unit connected to the loudspeaker for producing sound in the form of speech via the loudspeaker;
a simulated trachea connected with the simulated oral cavity and opening into the simulated oral aperture; and
an air delivery device configured to be operated to generate an air flow through the simulated trachea and into the simulated oral aperture.

2. A head simulator in accordance with claim 1, further comprising a control unit connected to the air delivery device, the control unit being configured to control the operation of the air delivery device in terms of flow direction and volume flow of the flow generated in the simulated trachea and the oral aperture.

3. A head simulator in accordance with claim 2, wherein the control unit is further configured to actuate the air delivery device to generate the flow with a predefined flow direction and with a predefined volume flow that is constant over time.

4. A head simulator in accordance with claim 2, wherein the control unit and the air delivery device are configured to generate the flow, which alternates in terms of a flow direction and simulates phases of inspiration and expiration with a volume flow profile that is variable over time under the control of the control unit.

5. A head simulator in accordance with claim 4, wherein the control unit is configured to operate the air delivery device with a volume profile that is variable over time with a larger mean volume flow value and comparatively longer-lasting phases of expiration with lower mean volume flow value.

6. A head simulator in accordance with claim 4, wherein the control unit is configured to synchronize the operation of the audio unit and of the air delivery device such that sound in the form of speech is produced via the loudspeaker exclusively during phases of expiration.

7. A head simulator in accordance with claim 2, wherein the air delivery device comprises a blower with a delivery capacity, wherein the delivery capacity is controlled by the control unit, in conjunction with a configuration of the simulated trachea.

8. A head simulator in accordance with claim 2, wherein the air delivery device comprises a bellows connected to the simulated trachea and an actuator, which actuator is configured and controlled by the control unit to act on the bellows in order to compress the bellows and to allow the bellows to expand again and thus to vary an inner volume thereof as a function of time such that the flow flowing through the simulated trachea and the simulated oral aperture is generated with a predefined flow profile alternating in terms of the flow direction.

9. A head simulator in accordance with claim 1, wherein:
the simulated trachea comprises a first, straight section leading through a cervical area of the head simulator body, a second, straight section and a bent transition area;
the second, straight section is connected to the first, straight section by the bent transition area;
the second, straight section is directed at a right angle relative to the first, straight section; and
the second, straight section has an end located away from the first section and said end forms the simulated oral aperture.

10. A head simulator in accordance with claim 9, wherein:
the simulated oral cavity is funnel-shaped with a smaller end with a smaller end dimension and with a larger end with a larger end dimension;
the loudspeaker is arranged at or adjacent to the larger end of the simulated oral cavity; and
the simulated oral cavity opens with the smaller end into the second section of the simulated trachea adjacent to the simulated oral aperture.

11. A head simulator in accordance with claim 9, wherein the first section and the second section of the simulated trachea are tubular with a diameter in the range of 15 mm to 45 mm.

12. A head simulator in accordance with claim 9, wherein the first section of the simulated trachea has a length in the range of 120 mm to 180 mm and the second section of the simulated trachea has a length in the range of 130 mm to 200 mm.

13. A head simulator in accordance with claim 10, wherein:
the funnel-shaped, simulated oral cavity opens into the second section of the simulated trachea obliquely from a top in front of the simulated oral aperture on a side of the second section of the simulated trachea located opposite the first section of the simulated trachea; and
a longitudinal axis of the funnel-shaped, simulated oral cavity is directed at an angle in the range of 0° to 90° to a longitudinal axis of the second section of the simulated trachea.

14. A head simulator in accordance with claim 13, wherein the funnel-shaped, simulated oral cavity is directed at an angle in the range of 30° to 60° to the longitudinal axis of the second section of the simulated trachea and opens into the second section of the simulated trachea directly in front of the simulated oral aperture.

* * * * *